US008360278B2

(12) United States Patent
Fiedler

(10) Patent No.: US 8,360,278 B2
(45) Date of Patent: Jan. 29, 2013

(54) PRESSURE VESSEL, SYSTEM AND/OR METHOD FOR DISPENSING A COMESTIBLE MIXTURE

(75) Inventor: Armin Fiedler, Chicago, IL (US)

(73) Assignee: Freeze King, Lake Geneva, WI (US)

( * ) Notice: Subject to any disclaimer, the term of this patent is extended or adjusted under 35 U.S.C. 154(b) by 756 days.

(21) Appl. No.: 11/999,423

(22) Filed: Dec. 5, 2007

(65) Prior Publication Data

US 2009/0145924 A1 Jun. 11, 2009

(51) Int. Cl.
*B67D 7/60* (2010.01)

(52) U.S. Cl. .... 222/95; 222/105; 222/185.1; 222/386.5; 222/399

(58) Field of Classification Search ............... 222/386.5, 222/397, 399, 92–105, 185.1
See application file for complete search history.

(56) References Cited

U.S. PATENT DOCUMENTS

| | | | | |
|---|---|---|---|---|
| 2,738,227 | A | * | 3/1956 | Havens ........................ 222/386.5 |
| 2,744,662 | A | * | 5/1956 | Smith et al. .................... 222/105 |
| 2,751,127 | A | * | 6/1956 | Mitton ........................ 222/386.5 |
| 2,823,953 | A | * | 2/1958 | McGeorge ................... 222/386.5 |
| 3,371,822 | A | | 3/1968 | Galloway |
| 3,741,438 | A | * | 6/1973 | Gardioni ........................... 222/96 |
| 5,048,724 | A | | 9/1991 | Thomas |
| 5,060,826 | A | | 10/1991 | Coleman |
| 5,143,390 | A | * | 9/1992 | Goldsmith ...................... 222/105 |
| 5,240,144 | A | | 8/1993 | Feldman |
| 5,251,787 | A | * | 10/1993 | Simson .......................... 222/95 |
| 5,265,764 | A | | 11/1993 | Rowe et al. |
| 5,265,766 | A | * | 11/1993 | Kurtzahn et al. .............. 222/105 |
| 5,301,838 | A | * | 4/1994 | Schmidt et al. ................. 222/95 |
| 5,361,941 | A | | 11/1994 | Parekh et al. |
| 5,392,958 | A | * | 2/1995 | Kurtzahn et al. .............. 222/105 |
| 5,405,054 | A | | 4/1995 | Thomas |
| 5,463,878 | A | | 11/1995 | Parekh et al. |
| 5,492,249 | A | | 2/1996 | Beach |
| 5,613,622 | A | * | 3/1997 | Surrena et al. ................ 222/105 |
| 5,653,360 | A | | 8/1997 | Brandhorst et al. |
| 5,782,382 | A | * | 7/1998 | Van Marcke .................... 222/52 |
| 5,797,520 | A | * | 8/1998 | Donahue ..................... 222/386.5 |
| 6,015,068 | A | * | 1/2000 | Osgar et al. ................. 222/400.7 |
| 6,223,941 | B1 | | 5/2001 | Nealey |
| 6,325,244 | B2 | | 12/2001 | Vincent et al. |
| 6,454,131 | B1 | | 9/2002 | Van Der Meer et al. |

(Continued)

FOREIGN PATENT DOCUMENTS

WO        WO 9112196 A1 *  8/1991

*Primary Examiner* — Kevin P Shaver
*Assistant Examiner* — Andrew P Bainbridge
(74) *Attorney, Agent, or Firm* — PATENTS+TMS, P.C.

(57) ABSTRACT

A pressure vessel, a system and/or a method dispense a comestible mixture. The pressure vessel, the system and/or the method are used to cool, freeze and/or entrain a gas into the comestible mixture before dispensing the same. The pressure vessel may have a lid and a body that are connected to form an air-tight compartment. The compartment is sized to receive a deformable bag of the comestible mixture. The bag has an opening to communicate the comestible mixture from the bag and/or the compartment through a hole in the lid. The pressure vessel, the system and/or the method has a compressor or other source of a compressed gas a hose to communicate the compressed gas from the compressor into the compartment. Further, the hose communicates the compressed gas to a freezing chamber and/or a cooling chamber of the machine. The pressure vessel, the system and/or the method has a tube to communicate the comestible mixture from the bag to the freezing chamber and/or the cooling chamber.

14 Claims, 2 Drawing Sheets

U.S. PATENT DOCUMENTS

| | | | |
|---|---|---|---|
| 6,595,392 B2 * | 7/2003 | Barnett | 222/105 |
| 6,691,893 B2 * | 2/2004 | Gauthier | 222/95 |
| 2003/0102335 A1 * | 6/2003 | Barnett | 222/386.5 |
| 2004/0007589 A1 * | 1/2004 | Leveen | 222/95 |
| 2007/0235471 A1 * | 10/2007 | Radermacher | 222/95 |

* cited by examiner

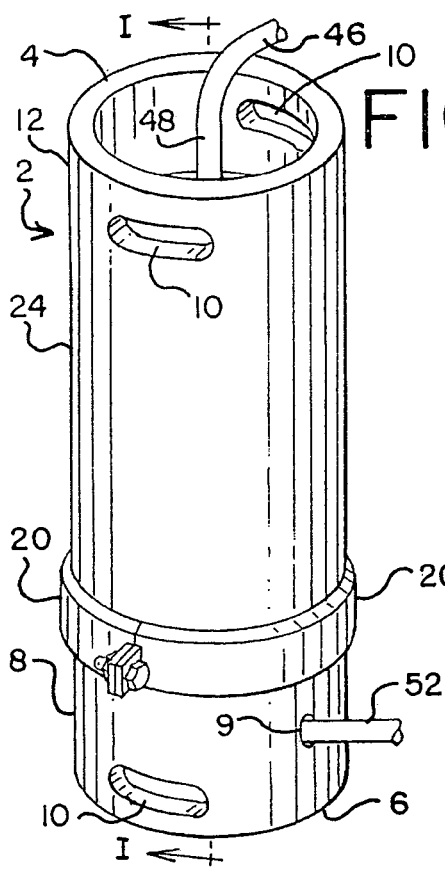
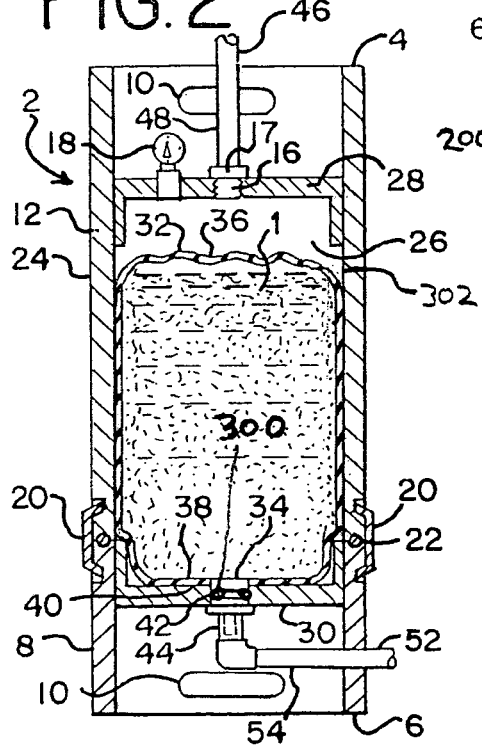
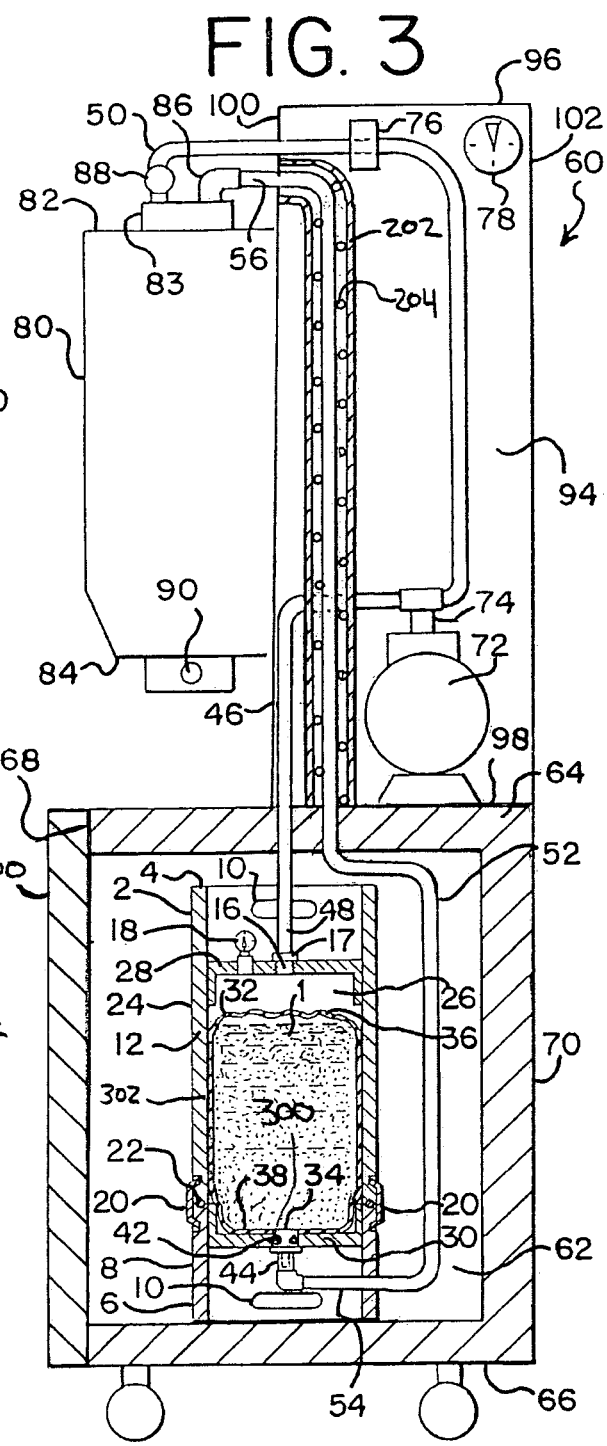

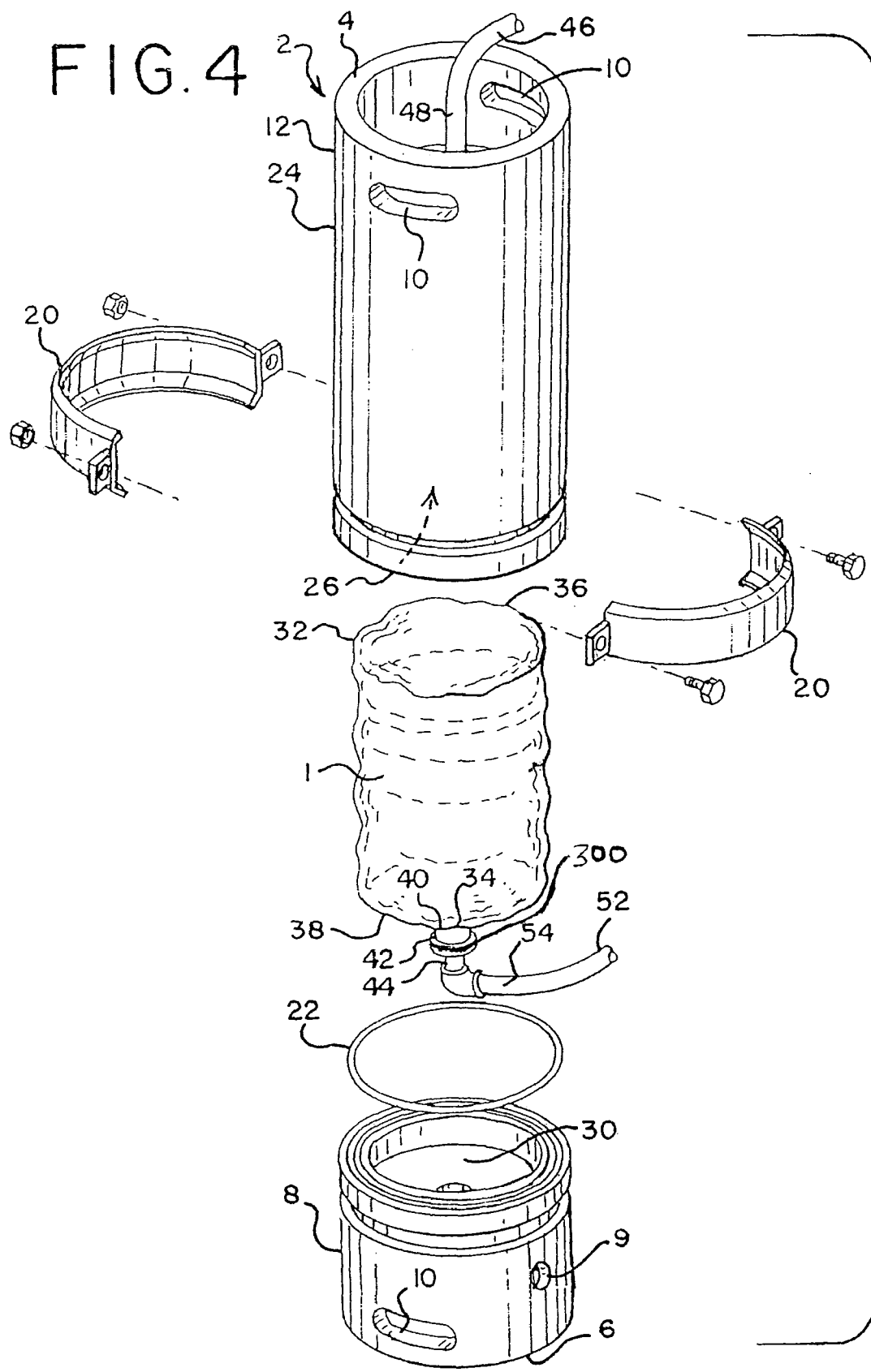

PRESSURE VESSEL, SYSTEM AND/OR METHOD FOR DISPENSING A COMESTIBLE MIXTURE

BACKGROUND OF THE INVENTION

The present invention generally relates to a pressure vessel, a system and/or a method for dispensing a comestible mixture. More specifically, the present invention relates to a pressure vessel, a system and/or a method that may be used to cool, freeze and/or entrain a gas into the comestible mixture before dispensing the same. The pressure vessel may have a lid and a body that may be connected to form an air-tight compartment. The compartment may be sized to receive a deformable bag of the comestible mixture. The bag may have an opening to communicate the comestible mixture from the bag and/or the compartment through a hole in the lid. The pressure vessel, the system and/or the method may have a compressor and/or other source of compressed gas and a hose to communicate the compressed gas from the compressor and/or the other source of compressed gas into the compartment. Further, the hose may communicate the gas to a mixing chamber, a freezing chamber and/or a cooling chamber. Moreover, the pressure vessel, the system and/or the method may have a tube to communicate the comestible mixture from the bag to the mixing chamber, the freezing chamber and/or the cooling chamber.

It is generally known that chilled or frozen confections are stored, prepared and dispensed from a dispensing machine, such as, for example, a soft-serve ice cream machine and/or a frozen yogurt machine. The dispensing machine may have a holding tank for storing and/or refrigerating the confections prior to mixing, freezing, entrainment and/or dispensation. The confections are transported from the holding tank to a freezing chamber of the dispensing machine with a metering device, such as, for example, a pump. The confections are mixed, chilled, frozen and/or entrained in the freezing chamber before being dispensed for packaging and/or consumption. Dispensing machines with holding tanks and pumps are refrigerated to retard bacterial growth in the confections. However, the holding tank, the pump and/or the freezing chamber must be cleaned and/or sanitized regularly to avoid bacterial contamination in the confections.

Further, it is generally known to store the confections in collapsible containers to allow the confection to be dispensed through the dispensing machine directly from the collapsible containers instead of the holding tank. The containers are collapsed by vacuum pneumatic pressure and/or pneumatic pistons which apply force to the collapsible container dispensing the confection from the collapsible container. Using collapsible containers retards bacterial growth and/or limits bacterial contamination in the confections and reduces the time required to maintain proper sanitization of the dispensing machine. However, known devices for using collapsible containers are difficult to load, maneuver, and connect to the vending machine. Moreover, known devices for using collapsible containers require pneumatic systems for collapsing the container that are separate from pneumatic systems used to entrain the confections before freezing and dispensation. As a result, known devices and dispensing machines for using collapsible containers are costly, difficult to manufacture and/or use and typically require larger amounts of space than dispensing machines with holding tanks.

A need, therefore, exists for a pressure vessel, a system and/or a method for dispensing a comestible mixture. Additionally, a need exists for a pressure vessel, a system and/or a method that may be used to cool, freeze and/or entrain a gas into the comestible mixture before dispensing the same. Further, a need exists for a pressure vessel, a system and/or a method that has a lid and a body that may be connected to form an air-tight compartment sized to receive a bag of the comestible mixture. Still further, a need exists for a pressure vessel, a system and/or a method that may retard bacterial growth in the comestible mixture and/or that may limit exposure of the comestible mixture to bacteria and/or other contaminants. Still further, a need exists for a pressure vessel, a system and/or a method that may have a handle to allow a user to maneuver the pressure vessel and/or the comestible mixture. Still further, a need exists for a pressure vessel, a system and/or a method that has a single compressor or other source of compressed gas to pressurize the compartment and to entrain the gas into the comestible mixture in the freezing chamber. Still further, a need exists for a pressure vessel, a system and/or a method that has a hose to communicate the compressed gas into the compartment and into the freezing chamber. Still further, a need exists for a pressure vessel, a system and/or a method that has a tube to communicate the comestible mixture from the bag into the freezing chamber. Moreover, a need exists for a pressure vessel, a system and/or a method that may be used to sanitize the tube, the freezing chamber and/or other components of the system.

SUMMARY OF THE INVENTION

The present invention generally relates to a pressure vessel, a system and/or a method for dispensing a comestible mixture. More specifically, the present invention relates to a pressure vessel, a system and/or a method that may be used to cool, freeze and/or entrain a gas into the comestible mixture before dispensing the same. The comestible mixture may be a liquid comestible mixture, such as, for example, an ice cream mix, a frozen yogurt mix, a margarita mix, a daiquiri mix, a slush mix and/or the like. The pressure vessel may have a lid and a body that may be connected to form an air-tight compartment. The compartment may be sized to receive a deformable bag of the comestible mixture. The bag may be, for example, a hermetically sealed pliable bag that may allow the comestible mixture to generally take the shape of a portion of the compartment. Alternatively, the bag may contain a solution for sanitizing the pressure vessel, and/or the system. The bag may have an opening to communicate the comestible mixture from the bag and/or the compartment through a hole in the lid. Further, the pressure vessel may have a valve and/or a connection to receive a compressed gas to pressurize the compartment and/or the bag. Still further, the pressure vessel may have a release valve to release the compressed gas from the compartment. Moreover, the pressure vessel may have one or more handles to allow a user to maneuver the pressure vessel and/or the comestible mixture.

The pressure vessel, the system and/or the method may have a compressor to compress the gas and a hose to communicate the compressed gas from the compressor into the compartment. Further, the hose may communicate the gas to a freezing chamber and/or a cooling chamber. The compressor may monitor a pressure in the compartment and/or in the hose and/or may maintain a specified pressure in the compartment and/or in the hose. Further, the pressure vessel, the system and/or the method may have a solenoid and/or a timer to control a release of the gas from the hose into the freezing chamber and/or the cooling chamber. Moreover, the pressure vessel, the system and/or the method may have a tube to communicate the comestible mixture from the bag to the freezing chamber and/or the cooling chamber. The lid may have an external valve to connect the tube to the lid to allow communication of the comestible mixture to the freezing chamber.

To this end, in an embodiment of the present invention, a pressure vessel for dispensing a comestible mixture is provided. The pressure vessel has a compartment having a height defined between a first end and a second end located at a position generally opposite to the first end wherein the compartment is defined by a body at the first end wherein the compartment is defined by a lid at the second end wherein the lid is removable from the body to open the compartment wherein the compartment is generally cylindrical between the first end and the second end wherein the compartment has a sealing member between the lid and the body wherein the compartment has a dispensing position relative to a surface wherein the second end is located between the first end and the surface in the dispensing position. Further, the pressure vessel has an intake valve in the body wherein the intake valve receives a compressed gas to pressurize the compartment. Still further, the pressure vessel has a dispensing valve in the lid to dispense the comestible mixture. Moreover, the pressure vessel has a bag to hold the comestible mixture wherein the bag may be sized to fit within the compartment wherein the bag has a top end and a bottom end wherein the bottom end is positioned opposite to the top end wherein the bag has an opening at the bottom end to communicate the comestible mixture wherein the bag has a connector to attach the opening to the dispensing valve in the lid of the compartment wherein the compressed gas exerts a force on the top end of the bag in a direction towards the surface to dispense the comestible mixture through the opening.

In an embodiment, the pressure vessel has a clamp to secure the lid to the body.

In an embodiment, the pressure vessel has a connecting means on the body to connect a hose to the intake valve to communicate the compressed gas into the compartment.

In an embodiment, the pressure vessel has a connecting means on the lid to connect a tube to the dispensing valve to communicate the comestible mixture from the bag.

In an embodiment, the pressure vessel has a release valve in the body to vent the compressed gas from the compartment.

In an embodiment, the sealing member is an o-ring.

In an embodiment, the compartment is constructed from a metal.

In an embodiment, the bag is constructed from a plastic.

In another embodiment, a system for dispensing a comestible mixture is provided. The system has a pressure vessel having a compartment, an intake valve, a dispensing valve and a deformable bag wherein the compartment has a lid that defines a bottom surface of the compartment wherein the dispensing valve is situated in the lid wherein the deformable bag contains the comestible mixture wherein the compartment surrounds the bag wherein the intake valve communicates a compressed gas into the compartment on top of the bag wherein the bag has an opening in communication with the dispensing valve to communicate the comestible mixture from the pressure vessel. Further, the system has a hose having a length defined between a first end and a second end wherein the second end is positioned opposite to the first end wherein the first end of the hose is connected to the intake valve of the pressure vessel. Still further, the system has a tube having a length defined between a first end and a second end wherein the second end is positioned opposite to the first end wherein the first end of the tube is connected to the dispensing valve of the pressure vessel. Still further, the system has a first chamber to freeze the comestible mixture communicated from the pressure vessel and to entrain the compressed gas into the comestible mixture wherein the second end of the hose and the second end of the tube are connected to the first chamber. Moreover, the system has a source of a compressed gas wherein the source of the compressed gas communicates the compressed gas into the hose at an input between the first end and the second end of the hose.

In an embodiment, the system has a second chamber that surrounds the pressure vessel wherein the second chamber refrigerates the pressure vessel.

In an embodiment, the system has a cooling coil that surrounds the tube wherein the cooling coil refrigerates the tube between the pressure vessel and the freezing chamber.

In an embodiment, the system has a solenoid in the hose between the input and the first chamber wherein activation of the solenoid releases the compressed gas into the freezing chamber.

In an embodiment, the system has a dispensing means on the first chamber to dispense the comestible mixture from the first chamber.

In an embodiment, the system has a means for timing a release of the compressed gas into the first chamber.

In an embodiment, the pressure vessel is constructed from one of stainless steel and plastic.

In another embodiment, a method for dispensing a comestible mixture is provided. The method has the step of providing a pressure vessel, a freezing chamber, a tube and a hose wherein the pressure vessel has an air-tight compartment, an intake valve, a dispensing valve and a deformable bag. Further, the method has the step of placing the comestible bag containing the comestible mixture inside the compartment. Still further, the method has the step of connecting the tube from the dispensing valve to the freezing chamber. Still further, the method has the step of connecting the hose from the intake valve to the freezing chamber. Still further, the method has the step of compressing the gas into the hose between the intake valve and the freezing chamber. Moreover, the method has the step of communicating the comestible mixture from the pressure vessel to the freezing chamber through the tube.

In an embodiment, the method has the step of releasing the compressed gas from the compartment to replace the bag.

In an embodiment, the method has the step of controlling the gas released from the hose into the freezing chamber.

In an embodiment, the method has the step of refrigerating at least one of the pressure vessel and the tube.

In an embodiment, the method has the step of releasing a controlled amount of the comestible mixture from the freezing chamber.

It is, therefore, an advantage of the present invention to provide a pressure vessel, a system and/or a method for dispensing a comestible mixture.

Another advantage of the present invention is to provide a pressure vessel, a system and/or a method for dispensing a comestible mixture that may be used to cool, freeze and/or entrain a gas into the comestible mixture before dispensing the same.

And, another advantage of the present invention is to provide a pressure vessel, a system and/or a method for dispensing a comestible mixture that may have a lid and a body that may be connected to form an air-tight compartment sized to receive a deformable bag of the comestible mixture.

Yet another advantage of the present invention is to provide a pressure vessel, a system and/or a method for dispensing a comestible mixture that may have a valve to communicate the comestible mixture from the bag and/or the compartment through a hole in the lid.

A further advantage of the present invention is to provide a pressure vessel, a system and/or a method for dispensing a comestible mixture that may have a compressor to compress the gas and a hose to communicate the compressed gas from the compressor into the compartment of the pressure vessel.

Moreover, an advantage of the present invention is to provide a pressure vessel, a system and/or a method for dispensing a comestible mixture that may have a hose that may communicate the gas to a freezing chamber and/or a cooling chamber.

And, another advantage of the present invention is to provide a pressure vessel, a system and/or a method for dispensing a comestible mixture that may have a tube to communicate the comestible mixture from the bag to the freezing chamber and/or the cooling chamber.

Yet another advantage of the present invention is to provide a pressure vessel, a system and/or a method for dispensing a comestible mixture that may retard bacterial growth in the comestible mixture.

Another advantage of the present invention is to provide a pressure vessel, a system and/or a method for dispensing a comestible mixture that may have a handle on the pressure vessel to allow a user to maneuver the pressure vessel and/or the comestible mixture.

Yet another advantage of the present invention is to provide a pressure vessel, a system and/or a method for dispensing a comestible mixture that may have a single compressor to compress gas to pressurize the compartment of the pressure vessel and to entrain the gas into the comestible mixture within the cooling chamber and/or the freezing chamber.

A still further advantage of the present invention is to provide a pressure vessel, a system and/or a method for dispensing a comestible mixture that may have a hose to communicate the compressed gas into the compartment and into the freezing chamber.

Moreover, an advantage of the present invention is to provide a pressure vessel, a system and/or a method for dispensing a comestible mixture that may be used to sanitize the tube, the freezing chamber and/or other components of the system.

And, another advantage of the present invention is to provide a pressure vessel, a system and/or a method for dispensing a comestible mixture wherein the comestible mixture may be a liquid comestible mixture, such as, for example, an ice cream mix, a frozen yogurt mix, a margarita mix, a daiquiri mix, a slush mix and/or the like.

Yet another advantage of the present invention is to provide a pressure vessel, a system and/or a method for dispensing a comestible mixture that may have bag for the comestible mixture wherein the bag may be, for example, a hermetically sealed pliable bag that may allow the comestible mixture to generally take the shape of a portion of the compartment of the pressure vessel.

Moreover, an advantage of the present invention is to provide a pressure vessel, a system and/or a method for dispensing a comestible mixture that may have a bag that may contain a solution for sanitizing the pressure vessel and/or the system.

And, another advantage of the present invention is to provide a pressure vessel, a system and/or a method for dispensing a comestible mixture that may have a release valve to release the compressed gas from the compartment of the pressure vessel to allow replacement of the bag.

Yet another advantage of the present invention is to provide a pressure vessel, a system and/or a method for dispensing a comestible mixture that may reduce sanitization costs and/or labor costs associated with dispensing of the comestible mixture.

Another advantage of the present invention is to provide a pressure vessel, a system and/or a method for dispensing a comestible mixture that may allow manufacturers of comestible mixtures, such as, for example, dairies, to ship comestible mixtures in bags ready to be dispensed without further exposure to bacteria and/or contaminates.

Additional features and advantages of the present invention are described in, and will be apparent from, the detailed description of the presently preferred embodiments and from the drawings.

BRIEF DESCRIPTION OF THE DRAWINGS

FIG. 1 illustrates a perspective view of a pressure vessel for dispensing a comestible mixture in an embodiment of the present invention.

FIG. 2 illustrates a cross-sectional view taken generally along line I-I of FIG. 1 of a pressure vessel for dispensing a comestible mixture in an embodiment of the present invention.

FIG. 3 illustrates a cross-sectional view of a system for dispensing a comestible mixture in an embodiment of the present invention.

FIG. 4 illustrates an exploded perspective view of a pressure vessel for dispensing a comestible mixture in an embodiment of the present invention.

DETAILED DESCRIPTION OF THE PRESENTLY PREFERRED EMBODIMENTS

The present invention generally relates to a pressure vessel, a system and/or a method for dispensing a comestible mixture. More specifically, the present invention relates to a pressure vessel, a system and/or a method that may be used to cool, freeze and/or entrain a gas into the comestible mixture before dispensing the same. The pressure vessel may have a lid and a body that may be connected to form an air-tight compartment. The compartment may be sized to receive a deformable bag of the comestible mixture. The compartment may be filled with a compressed gas that may apply a pressure to the bag to facilitate dispensation of the comestible mixture from the bag. The bag may have an opening to communicate the comestible mixture from the bag and/or the compartment through, for example, an opening in the lid. The pressure vessel, the system and/or the method may have a compressor to compress the gas and a hose to communicate the compressed gas from the compressor into the compartment. Further, the hose may communicate the gas to a freezing chamber and/or a cooling chamber. Moreover, the pressure vessel, the system and/or the method may have a tube to communicate the comestible mixture from the bag to the freezing chamber and/or the cooling chamber.

Referring now to the drawings wherein like numerals refer to like parts, FIGS. 1, 2 and 4 generally illustrate a pressure vessel 2 for dispensing a comestible mixture 1 from a bag 32 in an embodiment of the present invention. In an embodiment, the comestible mixture 1 may be a liquid comestible mixture, such as, for example, an ice cream mix, a frozen yogurt mix, a margarita mix, a daiquiri mix, a slush mix and/or the like. The comestible mixture 1 may be, for example, a precursor to a frozen confection, such as, for example, a soft serve ice cream, a frozen yogurt, a frozen margarita, a frozen daiquiri, a slush, a chilled beverage and/or the like. The comestible mixture 1 may be a mixture having a variety of ingredients and/or liquids and/or having varying viscosities depending on the confection produced and/or dispensed. Alternatively, the comestible mixture may be replaced by a sanitizing solution for sanitizing a system for dispensing confections. The present invention should not be deemed as limited to a specific embodiment of the comestible mixture 1. It should be understood that the comestible mixture 1 may be any mixture for producing, cooling, freezing and/or dispensing an edible confection and/or for sanitizing a dispensing system as known to one having ordinary skill in the art.

The pressure vessel 2 may be generally cylindrical in shape and/or may be constructed from metal, plastic and/or other like material that may have a rigidity to withstand pressure from a compressed gas stored within the pressure vessel 2. In an embodiment, the pressure vessel may be constructed from, for example, stainless steel. The pressure vessel 2 may have a first end 4 and a second end 6 that may be located in a position generally opposite to the first end 4. The pressure vessel 2 may have an exterior wall 24 defined between the first end 4 and the second end 6. The pressure vessel 2 may have a lid 8 that may be removable from a body 12 of the pressure vessel 2. The lid 8, the body 12 and the exterior wall 24 may define a compartment 26 of the pressure vessel 2. The pressure vessel 2 may have a seal 22, such as, for example, a gasket and/or an o-ring between the lid 8 and the body 12 that may provide an air-tight seal between the lid 8 and the body 12. Further, the pressure vessel 2 may have one or more clamps 20 that may secure the lid 8 to the body 12. The present invention should not be deemed as limited to a specific embodiment of the pressure vessel 2, the lid 8, the body 12, the seal 22 and/or the clamps 20. It should be understood that the pressure vessel 2, the lid 8, the body 12, the seal 22 and/or the clamps 20 may be any vessel, lid, body, seal and/or clamp, respectively, as known to one having ordinary skill in the art.

In an embodiment, the first end 4 and/or the second end 6 of the pressure vessel 2 may have one or more handles 10 that may allow a user of the pressure vessel 2 to maneuver the pressure vessel 2. In an embodiment, one or more of the handles 10 may be situated on the lid 8 and/or on the body 12. In an embodiment, one or more of the handles 10 may be, for example, a cutout in the exterior wall 24 of the pressure vessel 2. The present invention should not be deemed as limited to a specific embodiment of the handles 10. It should be understood that the handles 10 may be any means for lifting, grabbing and/or maneuvering the pressure vessel 2, as known to one having ordinary skill in the art.

In an embodiment, as shown in FIGS. 2 and 4, the compartment 26 may be defined between a top side 28 and a bottom side 30 that may be located in a position generally opposite to the top side 28. The top side 28 may be a portion of the body 12. Further, the bottom side 30 may be a portion of the lid 8. The top side 28 may have an intake valve 16, such as, for example, a quick connect valve for receiving the compressed gas into the compartment 26. The top side 28 may have a release valve 18, such as, for example, a venting valve with a releasing means to vent the compressed gas from the compartment 26. In an embodiment, the intake valve 16 may have a connector 17 to connect a hose 46 for communicating the compressed gas into the compartment 26. The present invention should not be deemed as limited to a specific embodiment of the intake valve 16, the release valve 18 and/or the connector 17. It should be understood that the intake valve 16, the release valve 18 and/or the connector 17 may be any valve and/or connector, respectively, for communicating the compressed gas and/or for venting the compressed gas into and/or out of the compartment 26, as known to one having ordinary skill in the art.

In an embodiment, the bottom side 30 of the compartment 26 may have a connector 42 adjacent to the compartment 26 to attach the bag 32 to the lid 8. Further, the bottom side 30 may have a valve 44, such as, for example, a quick connect valve, a check valve and/or the like adjacent to the connector 42 to communicate the comestible mixture 1 from the bag 32 and/or the compartment 26 to a tube 52 for dispensing the comestible mixture 1. Further, the lid 8 may have an opening 9 between the second end 6 of the pressure vessel 2 and the bottom side 30 of the compartment 26 to receive the tube 52. The opening 9 may be sized to receive the tube 5 through the exterior wall 24 of the pressure vessel 2. The present invention should not be deemed as limited to a specific embodiment of the connector 42 and/or the valve 44. It should be understood that the connector 42 and/or the valve 44 may be any connector and/or valve for communicating the comestible mixture 1 from the compartment 26, as known to one having ordinary skill in the art.

In an embodiment, the bag 32 may be, for example, a pliable, a compressible, a deformable and/or a hermetically sealed bag for holding the comestible mixture 1. In an embodiment, the bag 32 may be constructed from a food grade plastic and/or other like material for preventing bacterial contamination of products stored within the bag 32. The bag 32 may have a height defined between a top end 36 and a bottom end 38 that may be located in a position generally opposite to the top end 36. In an embodiment, the bag 32 may have an opening 34 at the bottom end 38 to allow communication of the comestible mixture 1 from the bag 32. The bottom end 38 of the bag 32 may have a connector 40 adjacent to the opening 34 which may be received by the connector 42 of the compartment 26. The connectors 40, 42 may allow communication of the comestible mixture 1 in the bag 32 to the valve 44 of the compartment 26. In an embodiment, the compartment 26 may have a seal, such as, for example, an o-ring between the connector 40 and the connector 42. In an embodiment, the connector 40 may have a seal 300, such as, for example, an o-ring, a gasket and/or the like that may provide an air-tight seal between the bag 32 and the pressure vessel 2. The seal 300 may prevent a gas and/or air from escaping the pressure vessel 2 around the bag 32 through the second end 6. In an embodiment, the connector 40 may have, for example, an internal check valve that may automatically seal the bag 32 when the bag 32 is not connected to the connector 42. As a result, the bag 32 may be disconnected from the connector 42 at any time, even if the bag 32 still contains the comestible mixture 1.

In an embodiment, the bag 32 may be generally cylindrical in shape and/or may be sized to allow the comestible mixture 1 to assume a shape of a portion of the compartment 26. The bag 32 may, therefore, come into contact with an interior surface 302 of the pressure vessel 2. Further, the bag 32 may be constructed to withstand a variety of pneumatic pressures applied by the compressed gas in the compartment 26 without perforating and/or leaking the comestible mixture 1. The present invention should not be deemed as limited to a specific embodiment of the bag 32, the opening 34 and/or the connector 40. It should be understood that the bag 32, the opening 34 and/or the connector 40 may be any bag, opening and/or connector, respectively, for pneumatically communicating the comestible mixture 1 from the compartment 26, as known to one having ordinary skill in the art.

The pressure vessel 2 may be situated in a loading position. In the loading position, the first end 4 of the pressure vessel 2 may be located between the second end 6 of the pressure vessel 2 and a surface, such as, for example, the floor. In the loading position, the clamps 20 may be disengaged, and the lid 8 may be removed from the body 12. The top end 36 of the bag 32 containing the comestible mixture 1 may be lowered into the compartment 26. The connector 40 of the bag 32 may be connected to the connector 42 of the lid 8 exposing the opening 34 of the bag 32 to the valve 44 of the lid 8. The lid 8 may be fastened to the body 12 by placing the lid 8 on the body 12 and engaging the clamps 20. The pressure vessel 2 may then be rotated one hundred and eighty (180) degrees into a dispensing position.

As shown in FIGS. 1-4, in the dispensing position, the second end 6 of the pressure vessel 2 may be located between the first end 4 of the pressure vessel 2 and the floor. The tube 52 may be connected to the valve 44 on the bottom side 30 of the compartment 26. Further, the hose 46 may be connected to the intake valve 16 on the top side 28 of the compartment 26. The compressed gas may be communicated from the hose 46 into the compartment 26 and on top of the bag 32. A weight of the mix may bring the bag 32 in contact with the interior surface 302 of the pressure vessel 2. Further, the compressed gas may exert a downward pressure on top of the bag 32 further squeezing the bag 32 in contact with the interior surface 302 of the pressure vessel 2. As a result, the compressed gas presses on the top of the bag 32 in much the same manner as a piston may be used press on the bag 32 to expel contents of the bag 32. A pressure exerted on the bag 32 by the compressed gas may deform the bag 32 and/or may communicate the comestible mixture 1 from the bag 32 through the opening 34 and the valve 44 into the tube 52.

To replace the bag 32 which may be empty, while in the dispensing position, the compressed gas may be vented from the compartment 26 by using the release valve 18. The hose 46 may then be disconnected from the intake valve 16. Further, the tube 52 may be disconnected from the valve 44 on the bottom side 30 of the compartment 26. The pressure vessel 2 may then be rotated into the loading position, for example, by using the handles 10, the lid 8 may be removed and the bag 32 may be removed from the compartment 26 and/or may be replaced.

FIG. 3 generally illustrates a system 60 for adding air into the comestible mixture and/or dispensing the comestible mixture 1 from the pressure vessel 2 in an embodiment of the present invention. In an embodiment, as shown in FIG. 3, the system 60 may have a refrigerated chamber 62, a transition chamber 94, a freezing chamber 80, a compressor 72, a timer 78 and/or a solenoid 76. Further, the refrigerated chamber 62 may have a door 200 that may allow access to the refrigerated chamber 62.

In an embodiment, the refrigerated chamber 62 may have a height defined between a top end 64 and a bottom end 66 that may be located in a position generally opposite to the top end 64. Further, the refrigerated chamber 62 may have a width defined between a first side 68 and second side 70 that may be located in a position generally opposite to the first side 68. The refrigerated chamber 62 may be sized to receive and/or surround the pressure vessel 2 in the dispensing position.

Further, the refrigerated chamber 62 may have, for example, a refrigeration unit (not shown) for cooling air and/or refrigerating air around the pressure vessel 2 to lower a temperature of the comestible mixture 1 inside the bag 32 or the pressure vessel 2. Moreover, the refrigerated chamber 62 may have insulation for maintaining a temperature of the cooled and/or refrigerated air within the refrigerated chamber 62. Cooling and/or refrigeration of the air around the pressure vessel 2 may retard bacterial growth and/or multiplication in the comestible mixture 1. Further, cooling and/or refrigeration of the air around the pressure vessel 2 may reduce the amount of energy required to later freeze the comestible mixture 1 in the freezing chamber 80. As a result, a shelf life of the comestible mixture may be extended. The present invention should not be deemed as limited to a specific embodiment of the refrigerated chamber 62 and/or the refrigeration unit. It should be understood that the refrigerated chamber 62 and/or the refrigeration unit may be any refrigerated chamber 62 and/or refrigeration unit, respectively, as known to one having ordinary skill in the art.

In an embodiment, the transition chamber 94 may extend from the top end 64 of the refrigerated chamber 62. The transition chamber 94 may have a height defined between a top end 96 and a bottom end 98 that may be located in a position generally opposite to the top end 96. Further, the transition chamber 94 may have a width defined between a first side 100 and second side 102 that may be located in a position generally opposite to the first side 100. The transition chamber 94 may be sized to receive and/or surround the compressor 72, a portion of the hose 46, a portion of the tube 52, the solenoid 76 and/or the timer 78. Further, the transition chamber 94 may have insulation 202 that may surround the portion of the tube 52 in the transition chamber 94. Further, the tube 52 may have a refrigerating means, such as, for example, a copper cooling coil 204 that may surround the tube 52 within the insulation 202. The refrigerating means and/or the insulation 202 may cool and/or maintain a temperature of the hose 46 and/or may lower a temperature of the comestible mixture 1 inside the tube 52. Cooling and/or refrigeration of the portion of the tube 52 may retard bacterial growth and/or multiplication in the comestible mixture 1. Further, cooling and/or refrigeration of the tube 52 may reduce the amount of energy required to later freeze the comestible mixture 1 in the freezing chamber 80. The present invention should not be deemed as limited to a specific embodiment of the transition chamber 94, the insulation 202 and/or the refrigeration means. It should be understood that the transition chamber 94, the insulation 202 and/or the refrigeration means may be any chamber, insulation and/or refrigeration means, respectively, as known to one having ordinary skill in the art.

In an embodiment, the freezing chamber 80 may be attached to the transition chamber 94 between the top end 96 and the bottom end 98 of the transition chamber 94. The freezing chamber 80 may have a height defined between a top side 82 and a bottom side 84 that may be located in a position generally opposite to the top side 82. The top side 82 of the freezing chamber 80 may have a means for connecting and/or receiving (hereinafter "the means for connecting 83") the hose 46 and/or the tube 52. The means for connecting 83 may allow the comestible mixture 1 and/or the compressed gas to enter the freezing chamber 80 from the tube 52 and/or the hose 46, respectively. The freezing chamber 80 may freeze the comestible mixture 1 and/or may entrain the compressed gas into the comestible mixture 1 that may create overrun in the comestible mixture 1. Further, the bottom side 84 of the freezing chamber may have a means for dispensing 90 to allow a user of the system 60 to dispense the frozen and/or overrun comestible mixture 1 from the freezing chamber. The present invention should not be deemed as limited to a specific embodiment of the means for connecting 83, the freezing chamber 80 and/or the means for dispensing 90. It should be understood that the means for connecting 83, the freezing chamber 80 and/or the means for dispensing 90 may be any means for connecting, chamber and/or means for dispensing 90, respectively, as known to one having ordinary skill in the art.

In an embodiment, the hose 46 may have a length defined between a first end 48 and a second end 50 opposite to the first end 48. The hose 46 may be, for example, a pressure hose manufactured to withstand and/or to deliver compressed air without failing, perforating and/or leaking the compressed air. In an embodiment, the length of the hose 46 may be sized to communicate the compressed gas between the first end 4 of the pressure vessel 2 in the refrigerated chamber 62 through the transition chamber 94 to the top side of the freezing chamber 80. In an embodiment, the second end 50 of the hose 46 may have a connector 88 to connect the second end 50 of the hose 46 to the means for connecting 83 of the freezing chamber 80. The present invention should not be deemed as limited to a specific embodiment of the hose 46 and/or the connector 88. It should be understood that the hose 46 and/or the connector 88 may be any hose and/or connector to communicate the compressed gas as known to one having ordinary skill in the art.

In an embodiment, the tube 52 may have a length defined between a first end 54 and a second end 56 opposite to the first end 54. The tube 52 may be constructed from, for example, a food grade plastic and/or rubber to communicate the comestible mixture 1. In an embodiment, the length of the tube 52 may be sized to communicate the comestible mixture 1 between the second end 6 of the pressure vessel 2 in the refrigerated chamber 62 through the transition chamber 94 to the top side of the freezing chamber 80. In an embodiment, the second end 56 of the tube 52 may have a connector 86 to connect the second end 56 of the tube 52 to the means for connecting 83 of the freezing chamber 80. The present invention should not be deemed as limited to a specific embodiment of the tube 52 and/or the connector 86. It should be understood that the hose 52 and/or the connector 86 may be any tube and/or connector, respectively, to communicate the comestible mixture as known to one having ordinary skill in the art.

In an embodiment, as shown in FIG. 3, the compressor 72 may be secured to the bottom end 98 of the transition chamber 94. The compressor 72 may pressurize the gas and/or may release the pressurized gas through an output 74 into the hose 46. The output 74 may be connected to the portion of the hose 46 in the transition chamber 94 between the first end 48 and the second end 50 of the hose 46. The compressor 72 may monitor the pressure of the compressed gas in the hose 46 and, therefore, in the compartment 26 of the pressure vessel 2. Further, the compressor 72 may regulate the pressure of the compressed gas in the hose 46 and in the compartment 26. The compressor 72 may be adjusted to control the pressure maintained within the hose 46 and in the compartment 26. Adjusting the pressure may affect a flow rate of the comestible mixture 1 through the tube 52 into and/or from the freezing chamber 80. Further, adjusting the pressure may affect the flow rate of the gas into the freezing chamber 80 and/or may effect the entrainment of the gas into the comestible mixture 1 in the freezing chamber 80. In an embodiment, the gas may be, for example, air. The present invention should not be deemed as limited to a specific embodiment of the compressor 72 and/or the gas. It should be understood that the compressor 72 and/or the gas may be any compressor and/or source of compressed gas and/or compressible gas, respectively, as known to one having ordinary skill in the art.

To control entrainment of the gas into the comestible mixture 1 within the freezing chamber 80, the system 60 may have the timer 78 and/or the solenoid 76. In an embodiment, the solenoid 76 may be, for example, a pneumatic solenoid valve and may be located in the hose 46 between the output 74 of the compressor 72 and the freezing chamber 80. The solenoid 76 may be activated by the timer 78 to allow the compressed gas through the second end 50 of the hose 46 and into the freezing chamber 80. The timer 78 may be, for example, an analog timer, a digital timer and/or the like. Filling the freezing chamber 80 with the compressed gas may create overrun in the comestible mixture 1. The overrun may fluff and/or aerate the comestible mixture 1 while the comestible mixture 1 may be mixed and/or frozen in the freezing chamber 80. To achieve the amount of overrun desired, an activation time of the solenoid 76 and/or the pressure of the compressed gas may be adjusted depending on, for example, a fat content of the comestible mixture 1. In an embodiment, the solenoid 76 may be connected to and/or controlled by the timer 78. As the comestible mixture 1 is dispensed by the means for dispensing 90, the timer 78 may activate the solenoid 76 which may release the compressed gas into the freezing chamber. In an embodiment, for example, the timer 78 may activate the solenoid for less than five seconds. As a result, the solenoid 76 may release the compressed gas into the freezing chamber 80 for a length of time that may be set on the timer 78. In an embodiment, if the dispensing stops before the timer 78 is ready to open the solenoid 76, the solenoid 76 may open sooner the next time the dispensing begins to ensure that a correct amount of air is entrained into the comestible mixture 1 within the freezing chamber 80. In an embodiment, where no entrainment of the compressed gas is required, the timer 78 may be turned off. The present invention should not be deemed as limited to a specific embodiment of the solenoid 76 and/or the timer 78. It should be understood that the solenoid 76 and/or the timer 78 may be any solenoid and/or timer, respectively, for routing a compressed gas as known to one having ordinary skill in the art.

In an embodiment, after the pressure vessel 2 may be loaded with the bag 32 of the comestible mixture 1, the pressure vessel 2 may be connected to the tube 52 and the hose 46 and may be placed in the dispensing position within the refrigerated chamber 62 of the system 60. The refrigerated chamber 62 may cool and/or refrigerate the comestible mixture 1 inside the pressure vessel 2. The compressor 72 may be activated by a user of the system 60. Further, the user may adjust a pressure of the compressed air that may be created by the compressor 72 and may be loaded into the compartment 26 and/or the hose 46. Further, the user may adjust the timer 78 to control an amount of compressed air that may be released into the freezing chamber 80 when the solenoid 76 is activated. As the compressed air fills the compartment 26 and the hose 46, the compressed air exerts a load on the bag 32 to force the comestible mixture 1 from the pressure vessel 2 through the tube 52. The comestible mixture 1 may proceed through the transition chamber 94 and into the freezing chamber 80. In the freezing chamber 89, the comestible mixture 1 may be entrained with the compressed air that reaches the freezing chamber 80 at a position beyond the solenoid 76. The user may activate the means for dispensing 90 to extract the frozen and/or overrun comestible mixture 1 from the freezing chamber 80. As the frozen and/or overrun comestible mixture 1 is extracted from the freezing chamber 80 by the user, additional refrigerated comestible mixture 1 is forced through the tube 52 into the freezing chamber 80 where the comestible mixture 1 may be entrained with the compressed air using the solenoid 76 and/or the timer 78.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A pressure vessel for dispensing a comestible mixture, the comestible mixture having a weight, the pressure vessel comprising:
a compartment having a height defined between a first end and a second end located at a position generally opposite to the first end, the compartment being defined by a body at the first end to stand the pressure vessel upright on the first end in a loading position to load the compartment from the second end, the compartment being defined by a lid at the second end, the lid being removable from the body to expose the compartment at the second end of the compartment, the compartment being generally cylindrical and having an interior surface between the first end and the second end, the compartment having a dispensing position relative to a surface with the second end located between the first end and the surface in the dispensing position;

a sealing member between the lid and the body;

an intake valve in the body to receive a compressed gas to pressurize the compartment wherein the intake valve has a first connector to which a hose connects to communicate the compressed gas into the compartment;

a dispensing valve in the lid to dispense the comestible mixture;

a bag to contain the comestible mixture, the bag being pliable and being sized to insert the bag containing the comestible mixture into the compartment through the second end of the compartment, the bag having a top end and a bottom end, the bottom end being positioned opposite to the top end, the bag having an opening at the bottom end to communicate the comestible mixture, the bag having a connector to attach the bottom end of the bag to the lid, the connector having an internal check valve to seal the bag when the bag is not attached to the lid, the bottom side of the compartment having an additional connector to receive the connector of the bag to attach the bottom end of the bag to the lid so that the internal check valve is located between the first end and the second end of the compartment when the bag is connected to the lid, the weight of the comestible mixture brings the bag into contact with the interior surface while the compartment is in the dispensing position, the compressed gas exerts a force on the top end of the bag in a direction towards the surface to press the top end of the bag towards the surface and to dispense the comestible mixture through the opening and the internal check valve of the connector; and a handle in each of the lid and the first end of the compartment to position the compartment, the handle in the lid being a cutout in the lid.

2. The pressure vessel of claim 1 further comprising:
a clamp to secure the lid to the body, the clamp encompassing the body and the lid.

3. The pressure vessel of claim 1 further comprising:
a connecting means on the body to connect a hose to the intake valve to communicate the compressed gas into the compartment.

4. The pressure vessel of claim 1 further comprising:
a connecting means on the lid to connect a tube to the dispensing valve to communicate the comestible mixture from the bag.

5. The pressure vessel of claim 1 further comprising:
a release valve in the body to vent the compressed gas from the compartment.

6. The pressure vessel of claim 1 wherein the sealing member is an o-ring.

7. The pressure vessel of claim 1 wherein the bag is constructed from a food grade plastic.

8. The pressure vessel of claim 1 further comprising:
an exterior wall of the lid which extends downward when the lid is connected to the pressure vessel and the pressure vessel is positioned in the dispensing position wherein the handle in the lid and an aperture at a different position relative to the handle are located in the exterior wall of the lid and further wherein the tube extends from the dispensing valve through the aperture.

9. The pressure vessel of claim 1 further comprising:
an o-ring positioned between the connector and the additional connector when the bag is connected to the lid.

10. A system for dispensing a comestible mixture, the system comprising:

a pressure vessel having a first end, a second end locaed in a position generally opposite to the first end, and a cylindrical exterior wall extending from the first end to the second end;

a cylindrical lid removable from the pressure vessel, the lid having an exterior wall substantially coplanar with the exterior wall of the pressure vessel;

a first seal between the lid and the exterior wall of the pressure vessel, the first seal being a first o-ring;

clamps that secure the lid to the exterior wall of the pressure vessel and cover the first o-ring, the clamps formed by a first clamp and a second clamp that encircle that pressure vessel when the first clamp connects to the second clamp to secure the lid to the exterior wall of the pressure vessel;

a compartment located within the pressure vessel, the compartment having a top side and a bottom side located in a position generally opposite to the top side, the bottom side being covered by a portion of the lid when the lid is connected to the pressure vessel and exposed when the lid is disconnected from the pressure vessel, the exterior walls of the pressure vessel extending upward from the top side of the compartment;

an intake valve in the top side of the compartment for conveying compressed gas into the compartment, the intake valve having a first connector to which a hose connects to communicate the compressed gas into the compartment;

a release valve in the top side of the compartment for conveying compressed gas from the compartment;

a second connector in the lid;

a bag which contains the comestible mixture, the bag being pliable and having a top end and a bottom end located in a position opposite to the top end;

an opening at the bottom end of the bag to communicate the comestible mixture from the bag;

a third connector attached to the opening, the third connector inserting into the second connector to connect the bag to the lid and communicate the comestible mixture from the bag to the dispensing valve, and the third connector having an internal check valve to seal the bag when the bag is not attached to the lid, the internal check valve being located between the top side and the bottom side of the compartment when the bag is connected to the lid;

a second seal positioned between the second connector and the third connector when the bag is attached to the lid, the second seal being a second o-ring; and a dispensing valve connected to the second connector to communicate the comestible mixture from the bag to a tube which is connected to the dispensing valve.

11. The system of claim 10 further comprising:
a first handle which is a cutout in the exterior wall of the pressure vessel, the first handle adjacent to the first end of the pressure vessel and located between the first end of the pressure vessel and the top side of the compartment; and
a second handle which is a cutout in the lid, the second handle located in the exterior wall of the lid.

12. The system of claim 10 wherein the comestible mixture is hermetically-sealed within the bag before attachment of the bag to the compartment.

13. The system of claim 10 wherein the bag is constructed from a food grade plastic.

14. The system of claim 10 further comprising:
an aperture in the exterior wall of the lid, the tube extending from the dispensing valve through the aperture.

* * * * *